(12) United States Patent
Piek et al.

(10) Patent No.: US 8,406,305 B2
(45) Date of Patent: Mar. 26, 2013

(54) METHOD AND SYSTEM FOR CREATING AN INTERPOLATED IMAGE USING UP-CONVERSION VECTOR WITH UNCOVERING-COVERING DETECTION

(75) Inventors: Matthijs Piek, 'S-Hertogenbosh (NL); Jacco Van Gurp, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 777 days.

(21) Appl. No.: 12/297,500

(22) PCT Filed: Mar. 29, 2007

(86) PCT No.: PCT/IB2007/051120
§ 371 (c)(1),
(2), (4) Date: Feb. 5, 2009

(87) PCT Pub. No.: WO2007/119183
PCT Pub. Date: Oct. 25, 2007

(65) Prior Publication Data
US 2009/0296818 A1 Dec. 3, 2009

(30) Foreign Application Priority Data

Apr. 19, 2006 (EP) .................................... 06112756

(51) Int. Cl.
*H04N 7/26* (2006.01)
(52) U.S. Cl. ................................. 375/240.16
(58) Field of Classification Search ............. 375/240.01, 375/240.16; *H04N 7/26*
See application file for complete search history.

(56) References Cited

U.S. PATENT DOCUMENTS

| 2006/0072790 A1 | 4/2006 | Wittebrood et al. | |
| 2007/0092111 A1* | 4/2007 | Wittebrood et al. | 382/107 |

FOREIGN PATENT DOCUMENTS

| JP | 2003533800 A | 11/2003 |
| JP | 2003533833 A | 11/2003 |
| WO | 200189225 A2 | 11/2001 |
| WO | 2005/027525 A1 | 3/2005 |
| WO | 2005022922 A1 | 3/2005 |

OTHER PUBLICATIONS

International Serach Report for PCT/IB2007/051120 mailed Jan. 7, 2009.

(Continued)

*Primary Examiner* — Y Lee
*Assistant Examiner* — Yulin Sun
(74) *Attorney, Agent, or Firm* — Bruce Greenhaus; Duane Morris LLP (57) ABSTRACT

The invention relates to a method for creating an interpolated image between a previous image and a current image in a video stream. The invention also relates to an image processing system for creating an interpolated image between a previous image and a current image in a video stream. The invention is based on the following principle: a motion estimator generates at least two vector fields, one at a temporal position smaller then 1A, and another at a temporal position greater than 1A. Then occlusion detection is done to detect covering and uncovering areas. A first vector is fetched from the first vector field and a second vector is fetched from the second vector field. If there is covering, the up-conversion vector is the second vector; if there is uncovering, the up-conversion vector is the first vector; if there is no uncovering-covering, the up-conversion may be either the first vector or the second vector. In this way, the up-conversion vector points at the correct original segment values in the previous image and the current image.

8 Claims, 6 Drawing Sheets

The first step

OTHER PUBLICATIONS

Olukayode Anthony Ojo et al., "Robust Motion-Compensated Video UpConversion", Nov. 1, 1997, pp. 1045-1056, vol. 43, No. 4, 1997 IEEE, XP0011008517.

Mark J.W. Mertens et al., "Motion vector field improvement for picture rate conversion with reduced halo", Proceedings of SPIE, Jan. 1, 2001, pp. 352-362, vol. 4310, Bellingham, VA, US, XP008025129.

De Haan, G and Biezen, P.W.A.C.; Sub-Pixel Motion Estimation With 3-D Recursive Search Block Matching, Signal Processing Immage Communication 6; pp. 229, 239; 1994.

Lunter, G.A.; "Occlusion-Insensitive Motion Estimation for Segmentation", Proceedings Fo the SPIE Visual Communications and Image Processing, pp. 573-584; Jan. 2002.

\* cited by examiner

Figure 7: Covering

Figure 8: Uncovering

Figure 9: No occlusion

METHOD AND SYSTEM FOR CREATING AN INTERPOLATED IMAGE USING UP-CONVERSION VECTOR WITH UNCOVERING-COVERING DETECTION

FIELD OF THE INVENTION

The invention relates to a method for creating an interpolated image between a previous image and a current image in a video stream. The invention also relates to an image processing system for creating an interpolated image between a previous image and a current image in a video stream.

BACKGROUND OF THE INVENTION

During the last couple of years frame-rate up-conversion for LCD televisions has typically been done for lower frame-rates like 50 and 60 frames per second. Recently, the market has been trying to address the sample-and-hold problem of LCD screens. One way of addressing this problem is by up-conversion to higher frame-rates, like 96, 100 or 120 frames per second. Unfortunately, doing up-conversion with a bigger factor also worsens the perceived quality of the video. This is among other factors caused by the fact that for a relatively longer time the interpolated images are shown. The commonly used motion estimation algorithm for frame-rate up-conversion is the 3DRS algorithm, which has been described in G. de Haan and P. W. A. C. Biezen, Sub-pixel motion estimation with 3-D recursive search block-matching, Signal Processing: Image Communication 6, pp. 229.239, 1994. This algorithm finds a vector for each block in the current frame by minimizing the Sum of Absolute Differences (SAD) for vectors taken from a block-dependent candidate set.

Several up-conversion techniques exist, like static and cascaded median. Details have been described in G. de Haan, *Video Processing for multimedia systems*, University Press Eindhoven, 2000. However, these techniques suffer from the so-called halo artifact. In images resulting from motion compensated image rate converters, artifacts are visible at the boundaries of moving objects, where either covering or uncovering of the background occurs. These artifacts are usually referred to as halos. There are two reasons for these halos. The first cause is the resolution of the motion vector field. Usually, the density of the grid at which the motion vectors are available is much less than that of the pixel grid. If, for example, motion vectors are available for blocks of 8×8 pixels then the contours of moving objects can only roughly be approximated at the vector grid, resulting in a blocky halo effect. A second cause is that a motion estimation unit, estimating motion between two successive images of a video sequence, cannot perform well in regions where covering or uncovering occurs, as it is typical for these regions that the background information only occurs in either of the two images.

Methods for performing uncovering-covering detection have been disclosed in US 2006/0072790 A1. Also see G. de Haan and P. W. A. C. Biezen, Sub-pixel motion estimation with 3-D recursive search block-matching, Signal Processing: Image Communication 6, pp. 229.239, 1994.

Recently several three-frame variants (G. A. Lunter, Occlusion-insensitive motion estimation for segmentation, in Proceedings of the SPIE: Visual Communications and Image Processing, pp. 573.584, January 2002) have been proposed in order to solve occlusion (covering or uncovering) problems. Occlusion occurs in areas of the images which are only visible in some, but not all, of the two or three reference frames. Errors resulting from occlusion are called halo artifacts. These three-frame variants can be used for frame-rate up-conversion using a vector field retimer. Such a vector field retimer is known from WO 2005/027525 A1. These documents disclose an algorithm which has been developed by Philips Research to solve the halo problem without platform constraints. The algorithm consists of two parts, the motion estimator and the temporal up-converter. However, the three-frame estimator and vector field retimer combination is quite expensive to implement.

There is a cheaper halo-reducing algorithm which has been described in patent application US 2006/0072790 A1. Document US 2006/0072790 A1 discloses a method for easily determining an appropriate motion vector in an occlusion region. The method comprises the following steps: computing a model-based motion vector for the pixel on basis of a motion model being determined on basis of a part of a motion vector field of the image; comparing the model-based motion vector with each of the motion vectors of the set of motion vectors; selecting a particular motion vector of the set of motion vectors on basis of the comparing and for assigning the particular motion vector as the background motion vector. However, it turned out to be very likely that this algorithm introduces new artifacts in the video and in practice the algorithm is almost completely turned off. Apart from this, it is also quite expensive to implement.

OBJECT AND SUMMARY OF THE INVENTION

It is an object of the invention to provide a method for creating an interpolated image which reduces the halo artifacts and which is relatively cheap. This object is achieved by the method according to claim 1.

It is another object of the invention to provide an image processing system for creating an interpolated image which reduces the halo artifacts and which is relatively cheap. This object is achieved by the image processing system according to claim 7.

It is a further object of the invention to provide a computer program product for carrying out the method according to the invention. This object is achieved by the computer program product according to claim 8.

The invention can be applied with a two-frame motion estimator, thereby reducing the implementation cost. The new approach distinguishes itself firstly in its goal. The invention does not presume to remove all halo problems, but it presumes to reduce the level of perceived halo in a partial way, e.g. for an up-conversion from 25 frames per second to 100 frames per second to the level of an up-conversion from 25 frames per second to 50 frames per second with cascaded median.

The invention is based on the following principle: a motion estimator generates at least two vector fields, one at a temporal position smaller then ½, and another at a temporal position greater than ½. Then occlusion detection is done to detect covering and uncovering areas. A first vector is fetched from the first vector field and a second vector is fetched from the second vector field. If there is covering, the up-conversion vector is the second vector; if there is uncovering, the up-conversion vector is the first vector; if there is no uncovering-covering, the up-conversion may be either the first vector or the second vector. In this way, the up-conversion vector points at the correct original segment values in the previous image and the current image.

Embodiments of the invention are defined in the dependent claims.

BRIEF DESCRIPTION OF THE DRAWINGS

The present invention is described in more detail with reference to the drawings, in which.

DESCRIPTION OF EMBODIMENTS

Temporal up-conversion involves an algorithm which uses two input images between which an interpolated image must be created. The earliest image is called the previous image and the most recent image is called the current image. The algorithm typically creates the interpolated image step-by-step: it creates motion vectors for segments of the image (for example blocks or pixels) and calculates interpolated values of the segments using the motion vectors to fetch the correct original values in the previous image and the current image.

Figure 1:
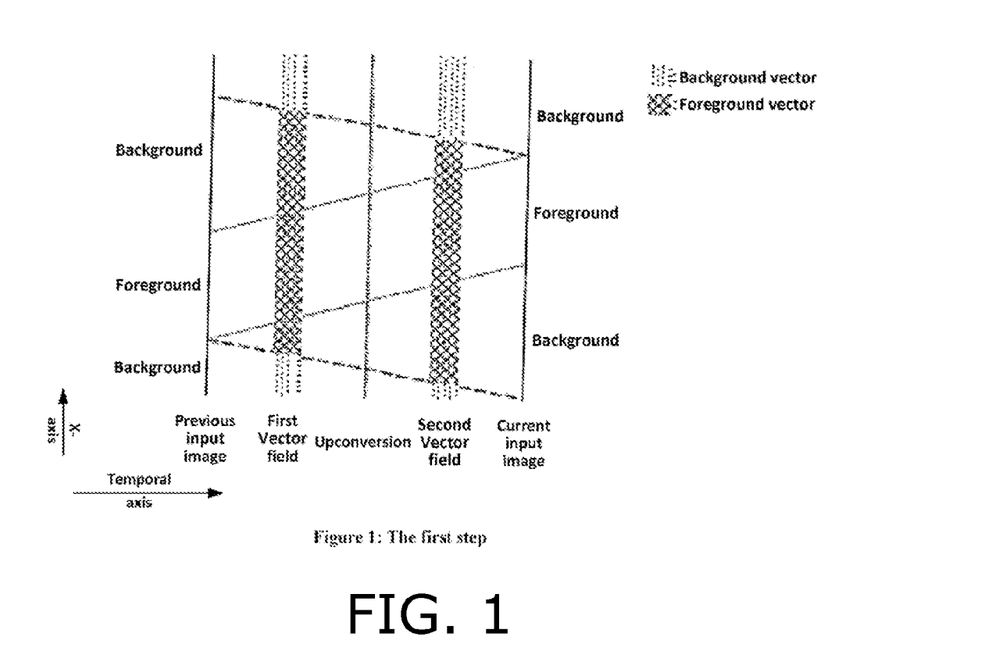
FIG. 1 illustrates a first step of a method according to the invention.

FIG. 1 illustrates a first step of a method according to the invention. In the first step of the algorithm, two normal two-image motion estimations are done with a motion estimator (for example a 3DRS-like estimator) between the previous and current image. The first estimation is at a temporal position smaller than ½; the second estimation is at a temporal position greater than ½. The temporal position ½ is defined as the position in time halfway the previous image and the current image. Because of the temporal position, the background vectors in the first vector field are relatively close to the foreground object in uncovering areas. Likewise, the background vectors in the second vector field are relatively close to the foreground object in covering areas.

The next steps are all done on a segment-by-segment basis and for each temporal position at which one wants to up-convert. For example, for up-conversion from 25 frames per second to 100 frames per second these temporal positions are ¼, ½ and ¾, but the algorithm is not limited to these positions.

Figure 2:
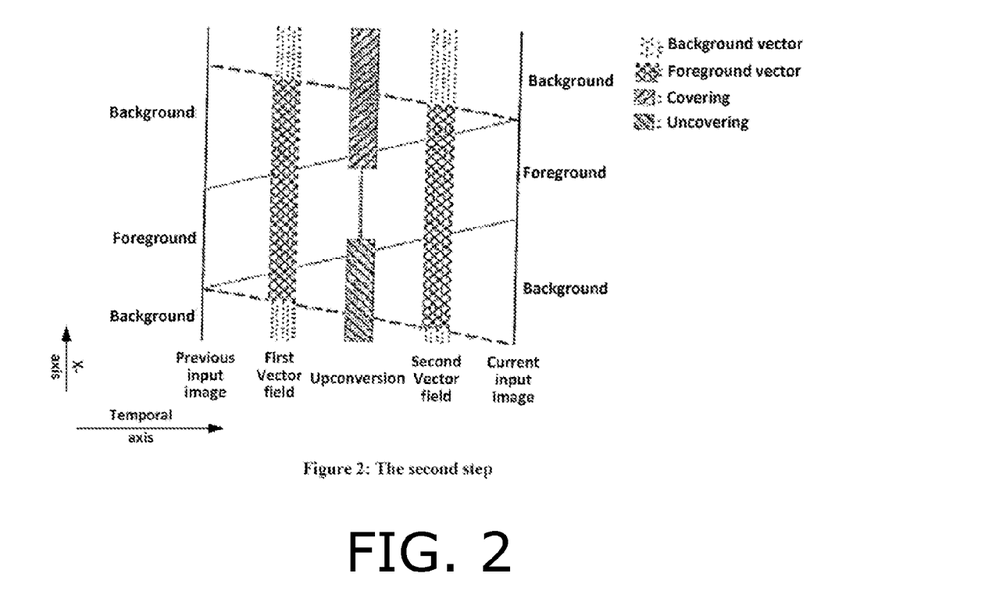
FIG. 2 illustrates a second step of a method according to the invention.

FIG. 2 illustrates a second step of a method according to the invention. In the second step, an uncovering-covering detection is performed by analyzing one or both of the vector fields. The uncovering-covering detection is performed as follows. In the second step the horizontal difference is calculated between the vector in N segment positions to the left of the current segment and the vector in N segment positions to the right of the current segment (wherein $N \leq 1$). This difference is compared to an occlusion threshold. The following holds:

$$mv_x(x-N, y) - mv_x(x+N, y) > T_{occlusion} \Rightarrow \text{uncovering} \quad (1)$$

$$mv_x(x-N, y) - mv_x(x+N, y) < -T_{occlusion} \Rightarrow \text{covering} \quad (2)$$

In this equation $mv_x(x, y)$ is the horizontal component of a vector at position (x,y) and $T_{occlusion}$ is the occlusion threshold.

Figure 3:
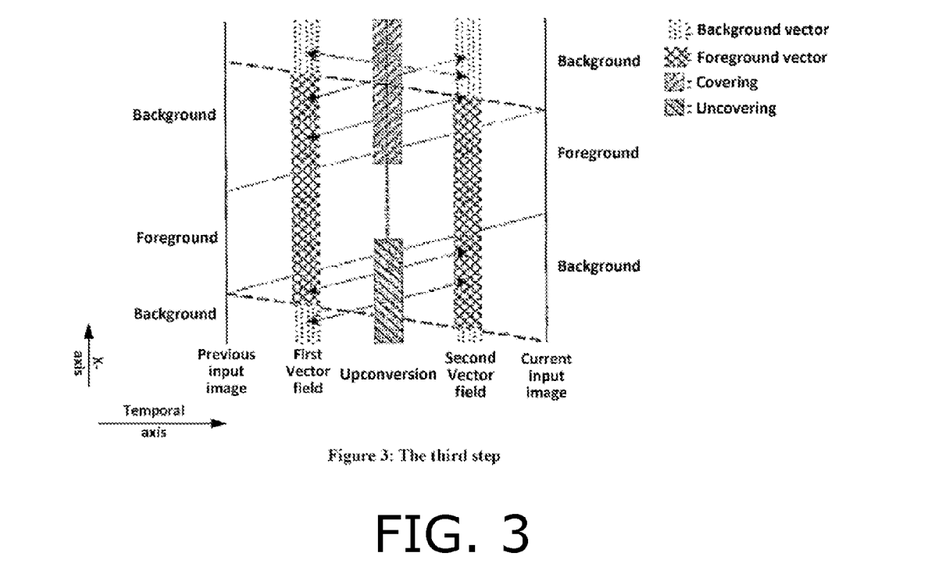
FIG. 3 illustrates a third step of a method according to the invention.

FIG. 3 illustrates a third step of a method according to the invention. The third step fetches two vectors from each of the vector fields in a motion compensated manner. If covering was detected it uses a vector from the first vector field for the compensation in order to give a high probability that a foreground vector is chosen. If uncovering was detected it uses a vector from the second vector field for the compensation in order to give a high probability that a background vector is chosen. If no covering or uncovering was detected, the zero vector is used. Along this vector, a vector $mv^{uncov}$ is fetched from the first vector field and a vector $mv^{cov}$ is fetched from the second vector field.

Figure 4:
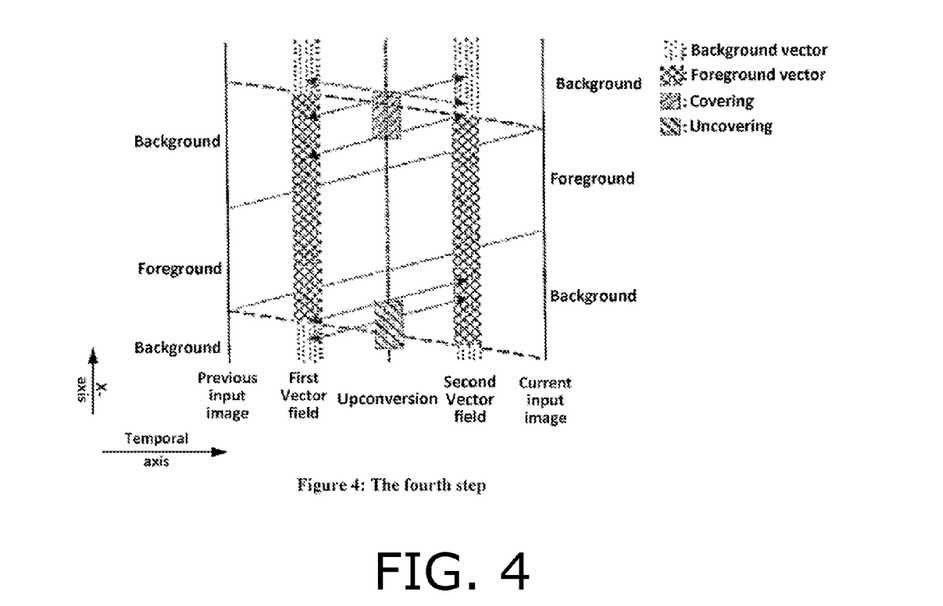
FIG. 4 illustrates a fourth step of a method according to the invention.

FIG. 4 illustrates a fourth step of a method according to the invention. The fourth step is a robustness step. A comparison is done between the horizontal component of $mv^{cov}$ and $mv^{uncov}$. If this is smaller than $T_{occlusion}$, the rest of the processing assumes there is no covering or uncovering.

Figure 5:
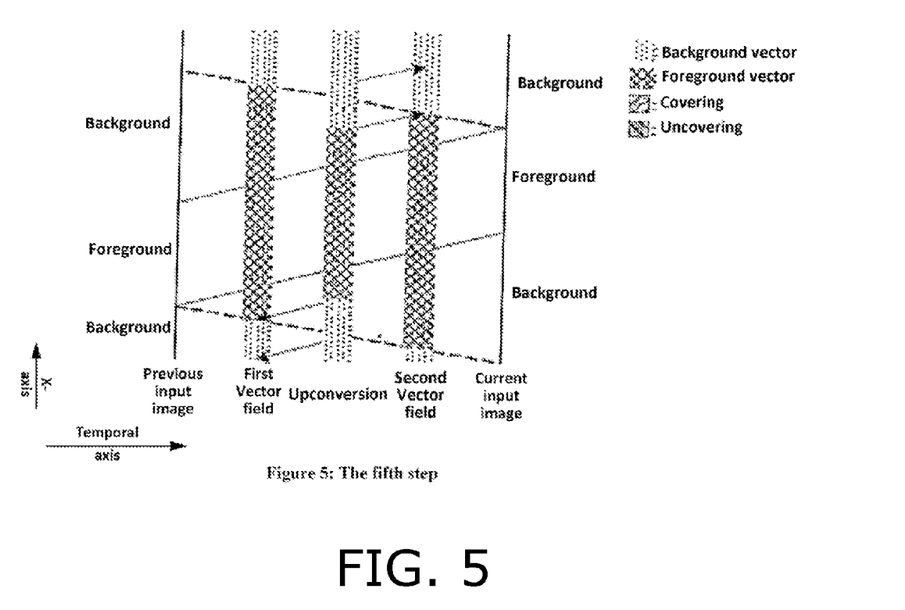
FIG. 5 illustrates a fifth step of a method according to the invention.

FIG. 5 illustrates a fifth step of a method according to the invention. The fifth step generates an up-conversion vector $mv^{upc}$ for the up-conversion of the current segment. $mv^{cov}$ is chosen if there is covering, $mv^{uncov}$ if there is uncovering and mv(x,y) if there is neither. If there is no covering-uncovering, the up-conversion vector may be arbitrarily selected from $mv^{cov}$ and $mv^{uncov}$. Also, an occlusion mask is generated. This mask is a two-dimensional field which is 1 at blocks where there is covering, −1 at blocks where there is uncovering and 0 at blocks where there is neither. This occlusion mask is low-pass filtered.

Figure 6:
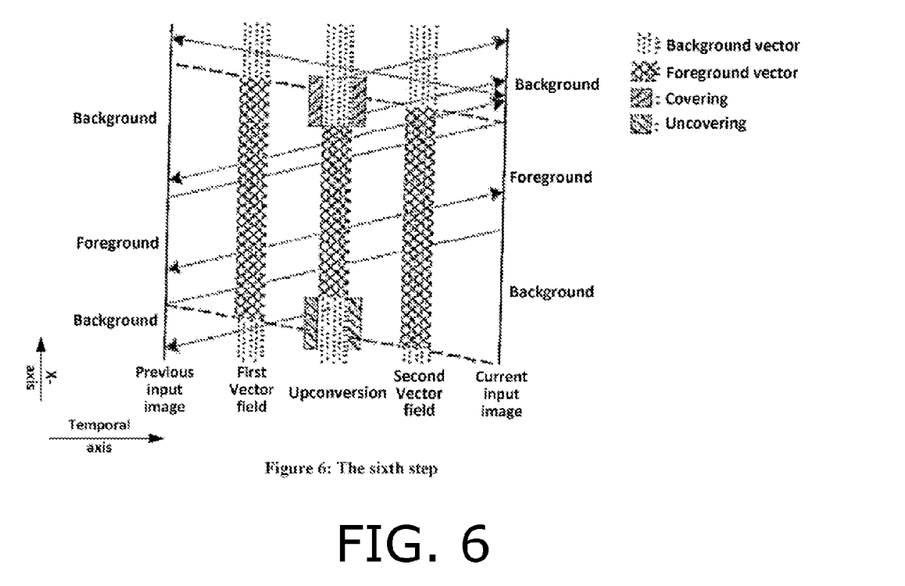
FIG. 6 illustrates a sixth step of a method according to the invention.

FIG. 6 illustrates a sixth step of a method according to the invention. The sixth step does the actual up-conversion with vector $mv^{upc}$. A standard cascaded median is done if the occlusion mask is 0 at the current segment. If the occlusion mask is greater than 0, the up-conversion is a mix between the dynamic median and a single-sided fetch along the vector $mv^{upc}$ from the current image. The mix is controlled by the value in the occlusion mask. If the value is farther removed from 0, more of the single-sided fetch is mixed in. If the occlusion mask is smaller than 0 a similar up-conversion is done, but then the single-sided fetch will be taken from the previous image.

Figure 7:
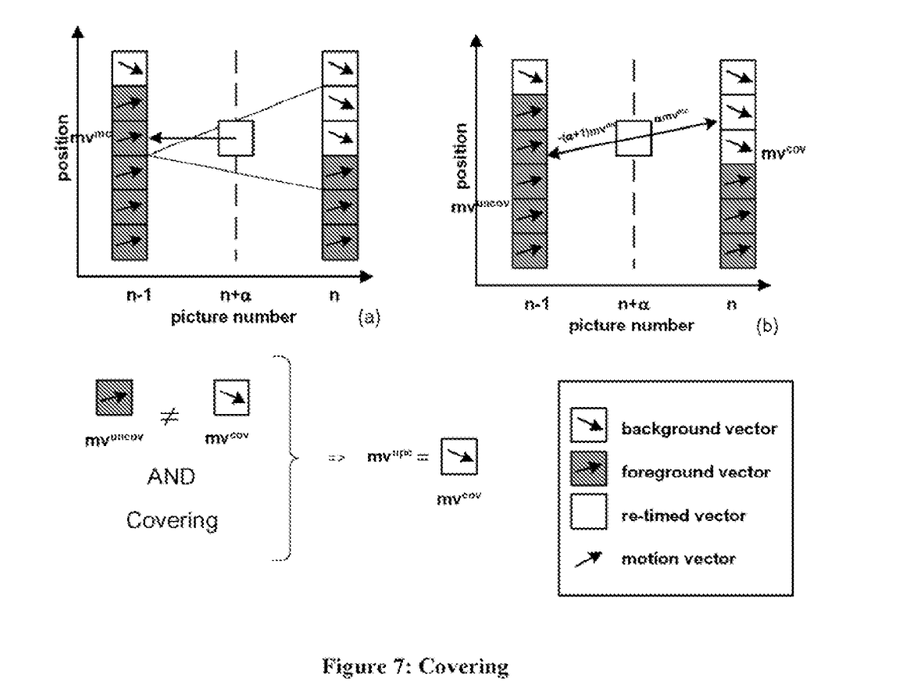
FIG. 7 illustrates the generation of an up-conversion vector if covering is detected.

FIG. 7 illustrates the generation of an up-conversion vector if covering is detected. If covering is detected, the up-conversion vector is taken from the second vector field. In this case a background vector is selected.

Figure 8:
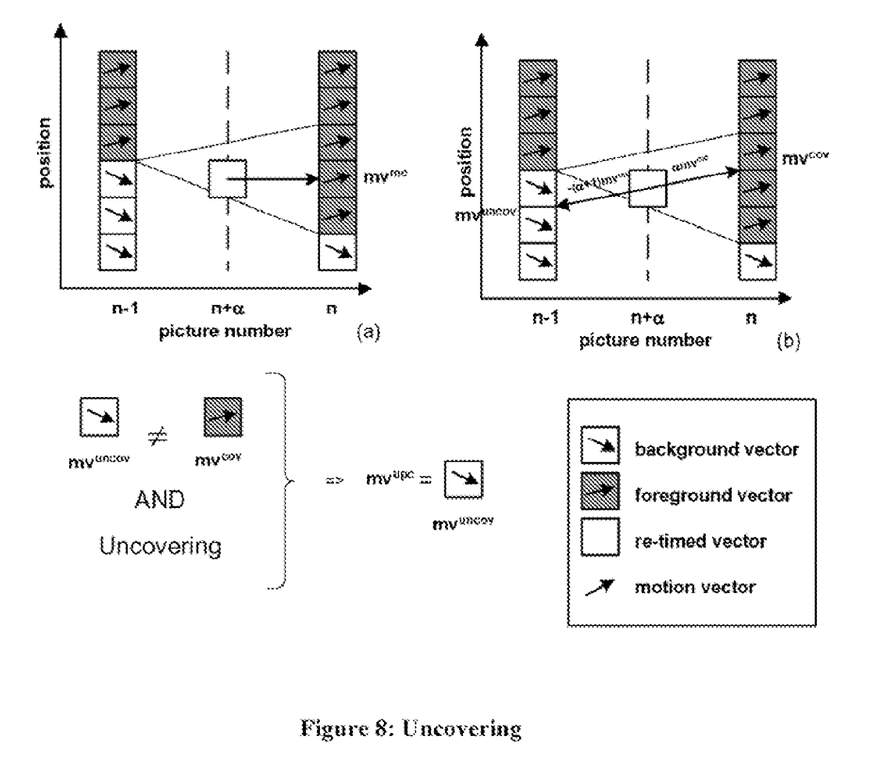
FIG. 8 illustrates the generation of an up-conversion vector if uncovering is detected.

FIG. 8 illustrates the generation of an up-conversion vector if uncovering is detected. If uncovering is detected, the up-conversion vector is taken from the first vector field. In this case a background vector is selected.

Figure 9:
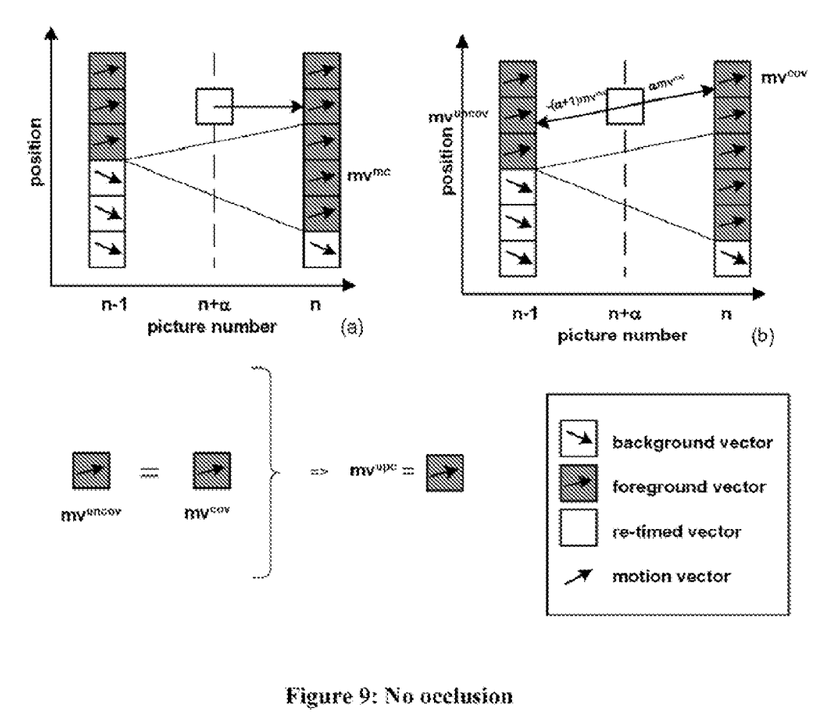
FIG. 9 illustrates the generation of an up-conversion vector if no uncovering-covering is detected.

FIG. 9 illustrates the generation of an up-conversion vector if no uncovering-covering is detected. If no uncovering-covering is detected, the up-conversion vector is arbitrarily selected from the first vector field and the second vector field. In this case a foreground vector is selected.

Hereinafter some alternatives and options will be described. One interesting option is to disable uncovering detection for up-conversion at temporal positions of ¼ and lower and to disable covering detection for temporal positions of ¾ and higher. This increases the robustness and decreases the implementation cost.

Another option is to not fetch vectors in a motion compensated manner, but to always fetch them over the zero vector. This reduces halo performance when the foreground is moving, but increases the robustness and decreases the implementation cost.

Another option is to interpolate vectors spatially when fetching vectors in a motion compensated manner. This will soften the edges of the halo area and will allow better halo performance overall, but increases the implementation cost. It is possible to make a smooth trade-off between robustness and halo performance by moving the temporal position of the estimations closer to or farther from 1½. Doing this dynamically would increase the implementation cost, but would greatly expand the possibilities of fallback control.

The invention has several advantages over prior art algorithms:

It allows an efficient and cheap implementation.
It allows an implementation with a relatively low latency.
It is possible to make a smooth trade-off between robustness and halo performance by moving the temporal position of the estimations closer to or farther from ½.
It is a relatively robust algorithm.

The method according to the invention may be carried out under control of a computer program product. During execution, normally the computer program product is loaded into a memory, like a RAM, and executed from there. The program may be loaded from a background memory, like a ROM, hard disk, or magnetically and/or optical storage, or may be loaded via a network like the Internet. Optionally an application specific integrated circuit provides the disclosed functionality.

It is remarked that the scope of protection of the invention is not restricted to the embodiments described herein. Neither is the scope of protection of the invention restricted by the reference symbols in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general-purpose processor. The invention resides in each new feature or combination of features.

The invention claimed is:

1. A method for creating an interpolated image between a previous image and a current image in a video stream, characterized by:
   (a) performing motion estimations between the previous and the current image, resulting in a first vector field and a second vector field, wherein a first one of the motion estimations is performed at a temporal position smaller than ½, and a second one of the motion estimations is performed at a temporal position greater than ½;
   wherein the contents of a segment of the interpolated image are determined by:
   (b) performing an uncovering-covering detection by analyzing at least one of the first vector field and the second vector field;
   (c) fetching a first vector from the first vector field and a second vector from the second vector field;
   (d) generating an up-conversion vector, wherein:
      (d1) if there is covering, the up-conversion vector is the second vector;
      (d2) if there is uncovering, the up-conversion vector is the first vector;
      (d3) if there is no uncovering-covering, the up-conversion vector is arbitrarily selected from the first vector and the second vector;
   (e) using the up-conversion vector to fetch original segment values in the previous image and the current image, and computing the interpolated value of the segment from the original segment values;
   (f) repeating steps (b) to (e) for each segment of the interpolated image.

2. A method according to claim 1, wherein the uncovering-covering detection in step (b) is performed by:
   (b1) calculating the horizontal difference between the vector in N segment positions to the left of the segment and the vector in N segment positions to the right of the segment,
   (b2) comparing the horizontal difference to an occlusion threshold using the formula $$mv_x(x-N, y) - mv_x(x+N, y) > T_{occlusion} \Rightarrow \text{uncovering} \quad (1)$$

$$mv_x(x-N, y) - mv_x(x+N, y) < -T_{occlusion} \Rightarrow \text{covering} \quad (2)$$

wherein $N \geq 1$, $mv_x(x, y)$ is the horizontal component of a vector at position (x,y) and $T_{occlusion}$ is the occlusion threshold.

3. A method according to claim 1, wherein the motion estimations are performed by a 3Dimensional Recursive Search motion estimator.

4. A method according to claim 1, wherein the fetching in step (c) is performed:
   (c1) along a vector from the first vector field if covering is detected,
   (c2) along a vector from the second vector field if uncovering is detected, and
   (c3) along a zero vector is no uncovering-covering is detected.

5. A method according to claim 2, wherein between step (c) and step (d) the following step is performed:
   comparing the horizontal components of the first vector and the second vector, and if the difference between the horizontal components is smaller than the occlusion threshold, performing steps (d) and (e) as if there is no uncovering-covering.

6. A method according to claim 1, wherein uncovering detection is disabled for up-conversion at temporal positions of ¼ and lower and covering detection is disabled for temporal positions of ¾ and higher.

7. Image processing system for creating an interpolated image between a previous image and a current image in a video stream, characterized in that the system comprises means for:
   (a) performing motion estimations between the previous and the current image, resulting in a first vector field and a second vector field, wherein a first one of the motion estimations is performed at a temporal position smaller than ½, and a second one of the motion estimations is performed at a temporal position greater than ½;
   determining the contents of a segment of the interpolated image by:
   (b) performing an uncovering-covering detection by analyzing at least one of the first vector field and the second vector field;
   (c) fetching a first vector from the first vector field and a second vector from the second vector field;
   (d) generating an up-conversion vector, wherein:
      (d1) if there is covering, the up-conversion vector is the second vector;
      (d2) if there is uncovering, the up-conversion vector is the first vector;
      (d3) if there is no uncovering-covering, the up-conversion vector is arbitrarily selected from the first vector and the second vector;
   (e) using the up-conversion vector to fetch original segment values in the previous image and the current image, and computing the interpolated value of the segment from the original segment values;

(f) repeating steps (b) to (e) for each segment of the interpolated image.

8. Computer program product on a non-transitory computer readable medium for carrying out the method according to claim 1.

* * * * *